July 11, 1950 — J. P. PUTNAM — 2,514,455
NAVIGATION MAP GAUGE
Filed Dec. 24, 1943
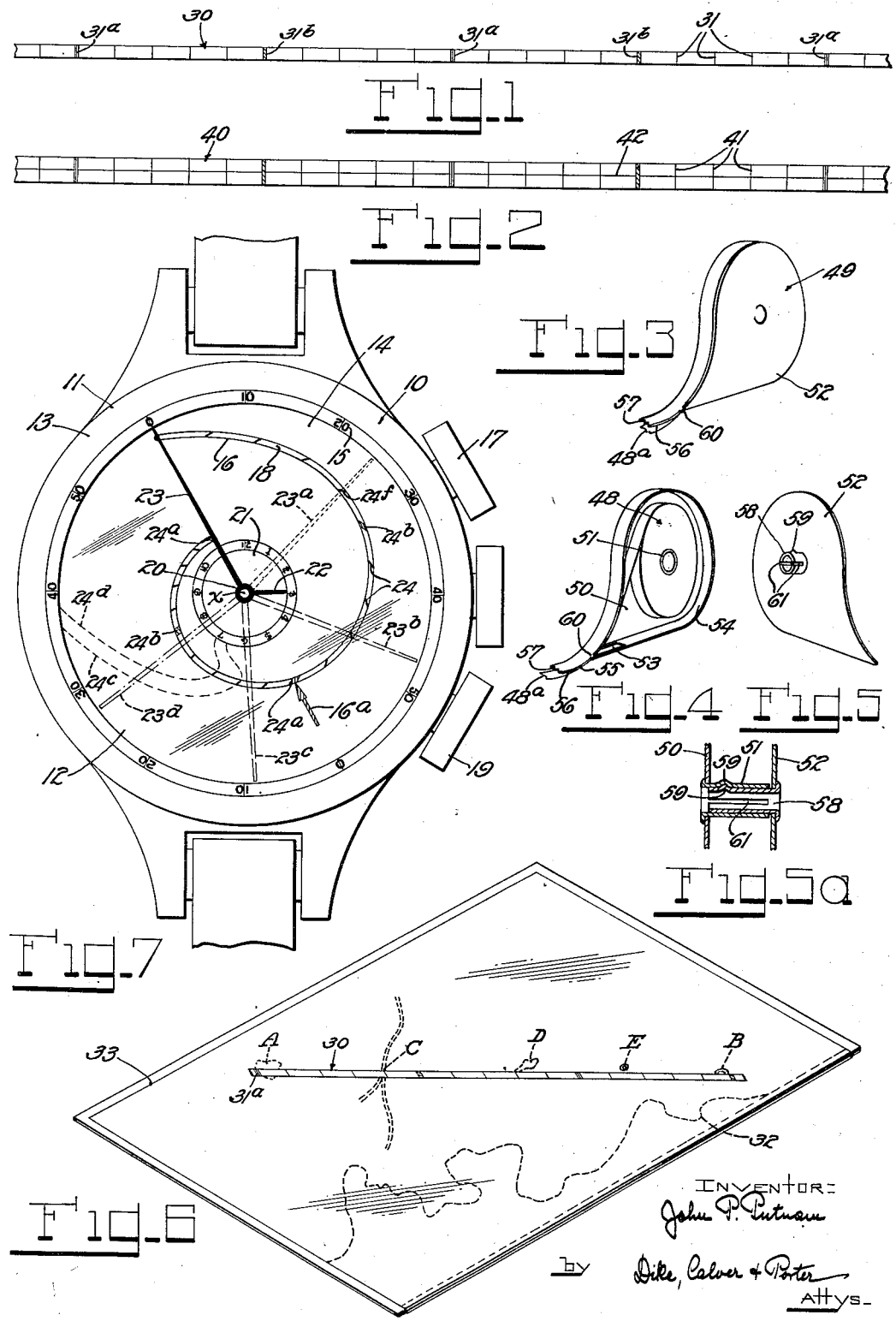
INVENTOR:
John P. Putnam
by Dike, Calver & Porter
Attys.

Patented July 11, 1950

2,514,455

UNITED STATES PATENT OFFICE 2,514,455

NAVIGATION MAP GAUGE

John P. Putnam, Boston, Mass., assignor, by mesne assignments, to The Reece Corporation, Boston, Mass., a corporation of Massachusetts Application December 24, 1943, Serial No. 515,626

5 Claims. (Cl. 33—137)

This invention relates to the art of navigation, especially aerial navigation, by the use of charts or maps.

In the use of aeronautical maps, it has hitherto been customary, and usually necessary, for the pilot to plot his proposed course on the map by drawing thereon lines from the point of departure to or through the objective point or points, ultimate or intermediate, and thereafter, during flight, in order to determine his position from time to time, repeatedly measure the various distances along these lines by the use of a separate scale. Lines so drawn on the map cannot subsequently be erased, even partially, without damaging the surface of the map and destroying some of the indicia thereon, but must be allowed to remain, so that after numerous flights between various points a map will become so marked up and defaced as to be unintelligible and virtually useless, requiring its replacement. Even the presence of a few lines on the map tends to confuse the pilot and materially increase the hazards of flying. Also the necessity of repeatedly scaling the plotted lines tends to distract the pilot's attention from the operation and control of the plane; this being particularly disadvantageous in the case of a man by himself in a plane and under unfavorable flying conditions such as bad weather, engine trouble, etc.

The present invention has for its primary object to contribute materially to the safety and convenience of the pilot of an airplane by eliminating the necessity of drawing and scaling lines on a pilotage map, thereby prolonging the life of the map, reducing the operations of the pilot tending to distract his attention from more important duties and as far as possible doing away with the dangers which may result from confusion between several lines on a map. To this end an embodiment of the invention includes a map scale capable of application to and removal from a map without injury to the surface of the map, said scale comprising a non-elastic, flexible tape graduated with repeating differentiating graduations on the same scale as that of the map with which it is to be used and having one face coated with a non-hardening adhesive, whereby said tape can be stretched across the map between the point of departure and the objective, and attached in this position to the map, but can readily be removed from the map, upon the completion of the flight, leaving the map in its original unmarred condition. The graduations of the tape directly indicate the distances on the map without scaling.

Such a tape is especially, although not exclusively, adapted to advantageous use in connection with a pilotage watch of the type described in the patent to Reece No. 2,334,287, November 16, 1943. A watch of this type comprises a scale graduated in distances, and the spacing of the graduations of which are variable in accordance with ground speed, together with a hand movable over the scale at a rate proportional to elapsed flight time, and adapted to be started at the zero point on the scale at the moment of departure, whereby the hand will, at any time, indicate on the scale the distance traversed from the point of departure at that time. The graduations of the watch scale are of such a character as to differentiate between distance intervals of different magnitudes, for example different colors being employed to represent ten, fifty, one hundred, etc. mile intervals. By making the graduations of the tape map scale correspond, as to their color or other differentiating characteristics, to those of the watch scale, the pilot can, at any time, by comparing the position of the watch hand with respect to the graduations of the watch scale with the corresponding graduations on the map scale, immediately identify his position on the map without any measurement or computation whatever.

The invention will best be understood from the following description of an illustrative embodiment thereof shown in the accompanying drawings, in which:

Fig. 1 is a plan view of a tape embodying the present invention.

Fig. 2 is a plan view of a tape embodying the present invention in a modified form.

Fig. 3 is a perspective view of a casing holding a supply of tape.

Figs. 4 and 5 are perspective views of a receptacle and cover, respectively, which make up the casing.

Fig. 5a is a fragmentary section through the casing.

Fig. 6 perspectively illustrates a map case to which a piece of tape has been attached in accordance with the present invention.

Fig. 7 is a plan view of a pilotage watch used in conjunction with the tape on the map case.

In Fig. 7 is shown at 10 a pilotage watch of the type disclosed in the Reece patent above referred to. Said watch, as more fully described in said patent, includes a minute hand 23 movable over a distance scale the graduations of which comprise the points of intersection with a spiral slot 16, in a dial disk 14, of spiral lines 24 on a disk 18. The disk 18 may be angularly adjusted with respect to the dial disk 14, to vary the spacing of the graduations, by means of a knob 19. The dial disk is inscribed about its margin with a minute scale 15, with its zero point opposite the outer end of the slot 16, and is angularly adjustable by means of a knob 17.

For convenience in reading, certain of the lines 24 are so marked as to contrast with the other lines. Thus, every tenth line 24a, corresponding, for example, to 100 mile intervals, may be colored red, and the intermediate fifth lines 24b, corresponding, for example, to 50 mile intervals, may be colored green, while the remaining lines 24 may be black.

The use of the pilotage watch or time piece, referred to and more fully shown and described in the beforementioned Reece patent, is as follows. At the time of departure, the dial 14 is angularly set by the knob 17 to bring the zero point of the minute scale 15 which is opposite the outer end of the spiral slot 16 into register with the continuously moving minute hand 23 (see full line position of said hand in Fig. 7), as well as align the zero point of the distance scale in the dial slot 16 (outer end of said slot) with said minute hand. The ground speed in miles per hour having been estimated, the disc 18 is turned by the knob 19 relative to the set dial 14 to bring the line 24a corresponding to the estimated ground speed (100 miles per hour in this instance) to intersection with the dial slot 16 opposite the index mark 16a. Thereafter, the minute hand 23, moving in a clockwise direction over the dial 14, will at any moment indicate on the distance scale in the dial slot 16 the distance traversed from the point of departure at that moment, assuming the correctness of the initially estimated ground speed for which the disc 18 has been set. This ground speed can, however, be checked and verified, or the setting of the instrument corrected in this respect, at any period in the flight by observing a recognizable landmark whose distance in miles from the point of departure is known or can be scaled on a map. Thus, after flying for almost 25 minutes, for instance, the minute hand 23 will assume the dotted line position 23a, and the pilot may then find himself over a landmark known to be 40 miles from the point of departure. Since the minute hand 23 at that time intersects the 40 mile line 24f in the dial slot 16, the pilot knows that his time piece is set for the correct ground speed. However, should the distance of the referred landmark from the departure point be other than 40 miles, the pilot when passing said landmark just when the minute hand reaches the position 23a, turns the disc 18 until the distance scale in the dial slot indicates opposite the minute hand the distance of said landmark from the departure point, whereupon said distance scale will indicate the actual ground speed opposite the index mark 16a.

Referring now to Fig. 1, there is shown a strip or tape 30 of paper or any other suitable flexible, transparent or non-transparent material, having its back face coated with adhesive and having its front face marked with transverse lines 31 constituting repeating differentiating graduations on the same scale as that of a map 32 (Fig. 6) on which a proposed flight may be charted. The map 32 is preferably placed in a transparent case 33 for protection as well as more feasible handling of the same. When used in connection with the pilotage watch above described, those graduations on the tape 30 which correspond to the differently marked or contrasted distance graduations of the pilotage watch are marked the same as the latter graduations in order to obtain the same contrast in the appearance of both graduation groups. Thus, in the example shown, every tenth graduation 31a on the tape 30, corresponding to a 100 mile interval, is colored red, the same as the corresponding graduation 24a of the pilotage watch 10, and the intermediate fifth graduations 31b on the same tape, corresponding to 50 mile intervals, are colored green, the same as the corresponding graduations 24b of the pilotage watch.

Preferably prior to an intended flight from a large city A to a smaller city B (Fig. 6), the pilot sticks the tape 30, or whichever length thereof is required, to the map case 33 (or, if preferred, directly to the map), so that a red graduation on said tape is opposite the point of departure A on the map 32 and the tape itself is in line with, and connects, the points of departure and destination on said map. When the pilot, after having first set his pilotage watch in accordance with an estimated ground speed of 100 miles per hour, for instance (Fig. 7), passes over the juncture C of two highways, he need merely observe whether the distance graduation 24f on his watch, corresponding to the 40 miles graduation on the tape 30 opposite the juncture C on the map, is just then traversed by the minute hand 23. If this is the case, he knows that his watch is correctly set. If this is not the case, he will correct the setting of his watch, as explained. The pilot may as readily recheck his watch when passing over the tip of a lake D and a town E, for instance (Fig. 6), and verify the ground speed indicated by his watch or correct the same in accordance with the actual ground speed if the same has in the meantime changed due to favorable or unfavorable wind conditions, for instance. If the pilot has correctly set his watch either initially or over the juncture C of the two highways, and the actual ground speed did not change, the minute hand 23 will reach the dash-line positions 23b and 23c and the dot-and-dash line position 23d when the plane passes over the tip of the lake D and over the town E, and reaches the destination point B, respectively. In accordance with one feature of the invention, the adhesive employed for coating the tape is of the non-hardening type commonly used on so-called "Scotch Tape." If such an adhesive is used, the tape, after it has served its purpose, can be readily removed from the map case; or, if the tape is directly attached to the map, it can be as readily removed from the latter without in any way damaging the surface of the latter. Thereafter the same or another length of tape can be applied to the map in accordance with another course, and subsequently removed, and this procedure can be repeated indefinitely while leaving the map in substantially its original condition, thereby greatly prolonging its life.

Is is evident from the foregoing that the intermediation of the tape 30 between the map and pilotage watch greatly facilitates the correct setting of the latter. Thus, to check the setting of his watch and use the same with full advantage, the pilot need not determine or even know the distances to any points on the contemplated course, including the destination point, nor need he previously decide on, and later watch for, any specific landmark or landmarks over which to check the setting of his watch, for the tape on the map case indicates to him at a glance the distance from the departure point of any prominent landmark, previously known or unknown to him, over which he may check the setting of his pilotage watch at his convenience. The watch having been set or adjusted for ground speed, the pilot can, at any moment, by comparing the indication of the watch hand on the watch distance scale with the corresponding point or graduation on the map scale, immediately determine his position on the map. It thus becomes clear that the application of the tape 30 to the map not only eliminates the heretofore indispensible preliminary task of analyzing a chartered course for suitable check points en route and intermediate distances, but also avoids the necessity of measuring distances on the map, simplifies the use of the pilotage watch and greatly enhances its value in navigation.

Fig. 2 shows another strip or tape 40 which is preferably of transparent paper and has its back side coated with adhesive. At its front face, the tape 40 is provided with transverse lines or graduations 41 which are in every respect like those on the tape 30 in Fig. 1. Intersecting the graduations 41 is a median index or base line 42 which is to be lined up with the points of departure and destination on a map. The advantage of the transparent tape 40 over the previously described tape 30 lies therein that the graduations of the former tape are better suited for ready coordination with check points on either side of the course on a map due to the extension of said graduations to both sides of the course. The course on the map is, moreover, distinctly marked by the median line 42 on the tape 40, and this median line, together with the intersecting graduations, more readily indicate to the pilot when he swerves off the course and to what extent.

A supply of the graduated tape material of either type described (Figs. 1 or 2) is advantageously rolled up as at 48 (Fig. 4) and placed in a casing 49 from which it may be paid out in any length required. The casing 49 preferably consists of a suitably formed receptacle 50, having a central hollow arbor 51 on which the tape roll 48 is journalled. A cover 52 (Fig. 5) is employed to close the receptacle 50. The receptacle 50 is also provided with a mouth 53 through which the leading end 48a of the tape roll 48 extends. The wall 54 of the receptacle 50 is continued beyond the mouth 53 to form a tape guide 55 of which an end portion 56 is substantially flat for pressing, and thereby attaching, the tape to a map or map case. The front edge of the tape guide 55 is serrated at 57 for severing from the supply a length of tape after attachment of same to a map or map case. To removably secure the cover 52 to the receptacle 50, a preferably hollow post 58 on said cover is received in the hollow arbor 51 of said receptacle. The arbor 51 and post 58 are preferably provided with impressed beads 59 (Fig. 5a) which are so arranged that they register (Fig. 5a) when the cover 52 closes the receptacle 50 and rests on a shoulder 60 on the tape guide 55. The registering beads 59 thus locate the cover 52 on the receptacle 50 and also releasably lock the former on the latter. To facilitate the registry of the beads 59, the hollow post 58 on the cover is longitudinally split at 61.

In applying tape to a map or map case, the leading end 48a of the tape roll is drawn away from the tape guide 55 of the casing 49 until the first red graduation shows up on the tape beyond said tape guide. A small portion of the tape withdrawn and containing the first red graduation may then be attached to the map or map case such that said graduation aligns with the point of departure on the map. More tape may then be withdrawn from the casing 49 and attached to the map or map case after first aligning the withdrawn tape with the point of destination on the map. The tape attached to the map or map case is finally severed from the supply roll with the aid of the serrated edge 57 of the tape guide 55.

The provision of a tape roll and its placement in a casing results in a highly practical navigation instrument which is small, compact and easy to handle, and which provides tape for numerous flights and is easily refilled with a new tape roll.

The present tape is also advantageously used without a pilotage watch. Thus, the attachment of the tape 30 to a map or map case (Fig. 6) along an intended course facilitates the charting of the course and immediately indicates to the pilot prominent landmarks on the course and the distances thereto. The tape thus serves, previous to a flight, to acquaint the pilot with all particulars of the course except the direction of the same, and also aids the pilot during a flight to follow the proper course and observe the progress of the flight by comparing a prominent landmark recognized or noted by him with the marking of the same landmark on the map.

Moreover, the herein described map scale, in the form of a non-elastic, freely flexible, suitably graduated adhesive tape or strip, obviates the necessity of the use of the straight edges heretofore required in pencil plotting the prospective course or courses on the map, since, as above explained, it is merely necessary to attach the tape or strip to the map at the point of departure and then stretch it across the map to the first objective point and attach it at other points, thereby automatically establishing a straight line or course on the map which course, due to the graduations on the tape scale, requires no subsequent scaling. Therefore, the hitherto necessary straight edges and separate scales are dispensed with. The elimination or reduction in number of the instruments necessary to use on a flight is of importance under practical flying conditions. Furthermore, the non-hardening character of the adhesive used on the tape makes it possible to apply lengths of tape to the map and remove them when they have served their purpose, which, in turn, enables the pilot, by use of the tape, to solve, directly on the map, various navigation problems which have heretofore had to be laid out on separate plotting paper, requiring the use of still other instruments, such as dividers or compasses, etc., whose necessity is likewise eliminated by the use of the tape.

I claim:

1. A map scale capable of attachment to and removal from the surface of a map without injury to said surface comprising a non-elastic, flexible tape graduated with repeating differentiating graduations on the same scale as that of the map with which it is to be used and having one face coated with a non-hardening adhesive, said graduations being visible on the face opposite to that on which the tape is coated.

2. A map scale capable of attachment to and removal from the surface of a map without injury to said surface comprising a non-elastic flexible tape graduated on one face with repeating differentiating graduations on the same scale as that of the map with which it is to be used and having its opposite face coated with a non-hardening adhesive.

3. A map scale capable of attachment to and removal from the surface of a map without injury to said surface, comprising a non-elastic flexible tape graduated on one face with repeating differentiating graduations on the same scale as that of the map with which it is to be used, some of which graduations are of differing colors repeated in sequence, and having its opposite face coated with a non-hardening adhesive.

4. A map scale capable of attachment to and removal from the surface of a map without injury to said surface comprising a non-elastic opaque narrow flexible tape having a width approaching that of a line, said tape being graduated on one face with repeating differentiating graduations on the same scale as that of the map with which it is to be used and having its opposite face coated with a non-hardening adhesive.

5. A map scale capable of attachment to and removal from the surface of a map comprising a transparent non-elastic flexible tape inscribed with an index or base line and graduated with repeating differentiating graduations on the same scale as that of the map with which it is to be used, said tape having a face coated with a non-hardening adhesive.

JOHN P. PUTNAM.

REFERENCES CITED

The following references are of record in the file of this patent:

UNITED STATES PATENTS

| Number | Name | Date |
|---|---|---|
| 975,689 | Greenwood | Nov. 15, 1910 |
| 1,116,918 | Putnam et al. | Nov. 10, 1914 |
| 1,534,055 | Coughlin | Apr. 21, 1925 |
| 1,969,939 | Nelson | Aug. 14, 1934 |
| 2,177,627 | Drew et al. | Oct. 31, 1939 |
| 2,187,087 | Leary | Jan. 16, 1940 |
| 2,334,287 | Reece | Nov. 16, 1943 |

FOREIGN PATENTS

| Number | Country | Date |
|---|---|---|
| 406,488 | Great Britain | Mar. 1, 1934 |